(12) United States Patent
Dudar et al.

(10) Patent No.: US 11,458,801 B2
(45) Date of Patent: Oct. 4, 2022

(54) STEERING WHEEL PRECONDITIONING

(71) Applicant: FORD GLOBAL TECHNOLOGIES, LLC, Dearborn, MI (US)

(72) Inventors: Aed M. Dudar, Canton, MI (US); Mahmoud Yousef Ghannam, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 570 days.

(21) Appl. No.: 16/553,324

(22) Filed: Aug. 28, 2019

(65) Prior Publication Data

US 2021/0061056 A1 Mar. 4, 2021

(51) Int. Cl.
*B60H 1/00* (2006.01)
*B62D 1/185* (2006.01)
(Continued)

(52) U.S. Cl.
CPC ..... *B60H 1/00292* (2013.01); *B60H 1/00735* (2013.01); *B60H 1/00871* (2013.01);
(Continued)

(58) Field of Classification Search
CPC ............ B60H 1/00292; B60H 1/00735; B60H 1/00871; B60H 1/00964; B60H 2001/003; B60L 53/14; B60L 1/04; B60L 2240/34; B60L 2240/36; B60L 2240/80; B60L 2250/14; B60Y 2200/91; B60Y 2200/92; B62D 1/181; B62D 1/185; B62D 1/187; B62D 1/04; B62D 15/00
See application file for complete search history.

(56) References Cited

U.S. PATENT DOCUMENTS 4,562,957 A * 1/1986 Nakagawa ........... B60H 1/2225
219/202
5,860,593 A * 1/1999 Heinle ................. B60H 1/0075
165/204
(Continued)

FOREIGN PATENT DOCUMENTS

JP 2006298016 A * 11/2006
JP 2006298016 A 11/2006

OTHER PUBLICATIONS

Lambert F., Tesla Releases New Mobile App Update with Remote Seat Heating and Service Scheduling, https://electrek.co/201/8/21/tesla-mobile-app-update-seat-heating-service-scheduling/, Dec. 21, 2018.

*Primary Examiner* — Emmanuel E Duke
(74) *Attorney, Agent, or Firm* — Frank L. Lollo; MacMillan, Sobanski & Todd, LLC

(57) ABSTRACT

Heating and/or cooling a vehicle interior, and in particular a steering wheel, may include receiving a heating/cooling request, automatically directing heated/cooled air from an HVAC duct through louvers adjacent to a steering wheel into a passenger compartment, and automatically rotating the steering wheel back-and-forth to change the location where the heated/cooled air is blown onto the steering wheel. This may include automatically telescoping and automatically tilting the steering wheel as well. Moreover, an infrared camera may be employed to determine where best to rotate the steering wheel for heating/cooling.

15 Claims, 1 Drawing Sheet

(51) Int. Cl.
  *B62D 1/187* (2006.01)
  *B60K 6/22* (2007.10)
  *B60L 53/14* (2019.01)
  *B62D 1/181* (2006.01)

(52) U.S. Cl.
  CPC .......... *B60H 1/00964* (2013.01); *B60K 6/22* (2013.01); *B60L 53/14* (2019.02); *B60Y 2200/91* (2013.01); *B60Y 2200/92* (2013.01); *B62D 1/181* (2013.01); *B62D 1/185* (2013.01); *B62D 1/187* (2013.01)

(56) References Cited

U.S. PATENT DOCUMENTS

| | | | |
|---|---|---|---|
| 6,012,297 A * | 1/2000 | Ichishi | B60H 1/00871 165/203 |
| 6,626,003 B1 | 9/2003 | Kortum et al. | |
| 9,090,282 B2 * | 7/2015 | Salvini | B62D 1/105 |
| 9,758,187 B2 * | 9/2017 | Nonoyama | B62D 1/065 |
| 9,815,488 B2 * | 11/2017 | Lofy | B62D 1/065 |
| 2011/0272131 A1 * | 11/2011 | Mikat | B60H 1/00742 236/91 C |
| 2012/0234930 A1 | 9/2012 | Wijaya | |
| 2016/0368519 A1 * | 12/2016 | Stefan | B62D 1/065 |
| 2017/0174247 A1 * | 6/2017 | Kossakovsk | B60H 1/00292 |

\* cited by examiner

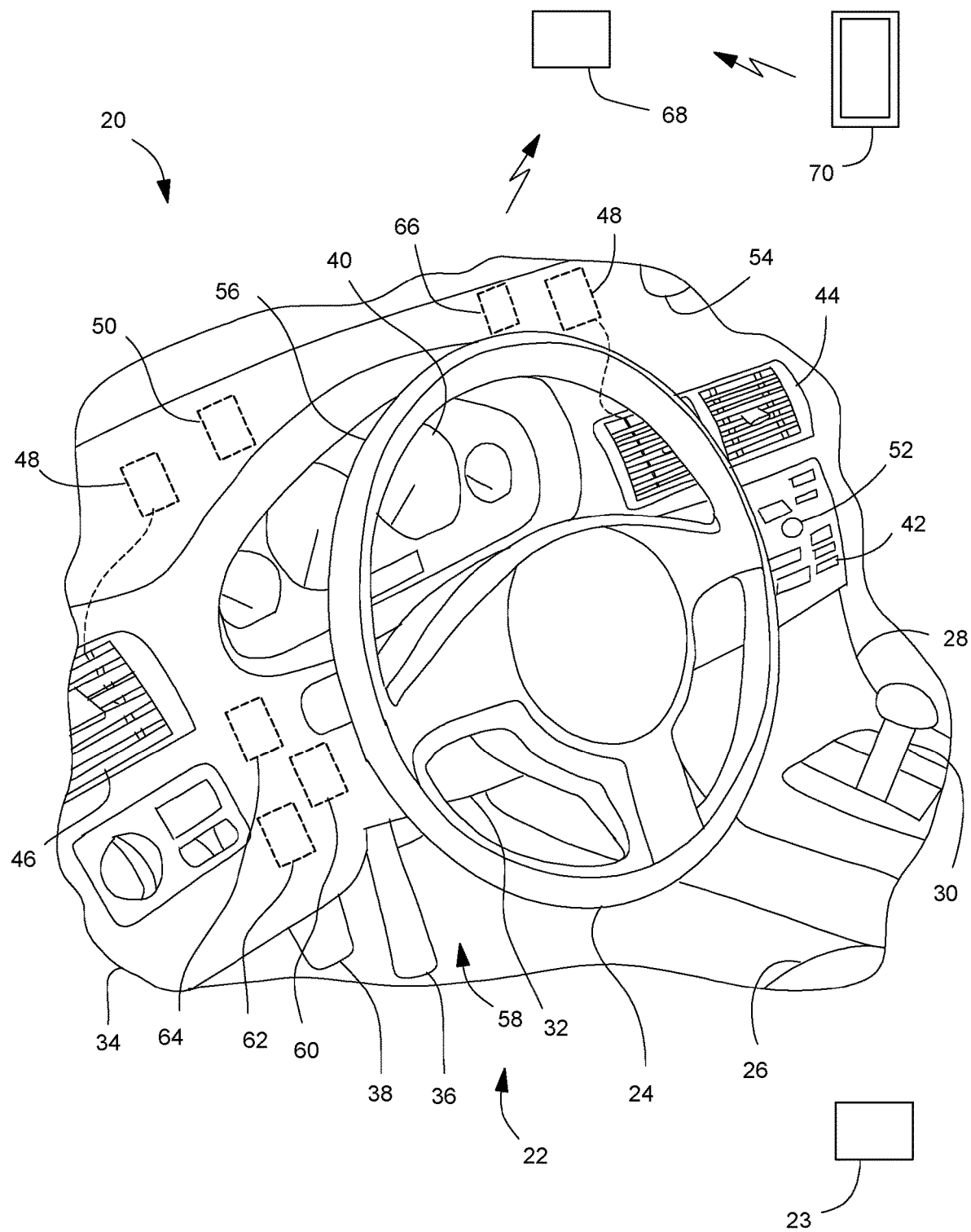

STEERING WHEEL PRECONDITIONING

BACKGROUND OF THE INVENTION

The present invention relates to a vehicle interior and more particularly to heating and cooling of a steering wheel in the vehicle.

Many automotive vehicles are being developed that will be powered as battery electric or plug-in hybrid electric vehicles. For these vehicles, either there is no internal combustion engine, in which case there is no engine driven alternator, or a wish to avoid starting the engine to drive an alternator. Accordingly, the heating and cooling of the passenger compartment, or components therein, use power from the battery used to propel the vehicle. But the use of the propulsion battery for this purpose adversely affects the driving range for the vehicle.

Many automotive vehicles also include comfort features, such as heated and cooled steering wheels. However, as discussed above, for electrified vehicles, such a feature may drain power from the propulsion battery. Some have proposed employing preconditioning of a steering wheel by activating a steering wheel heater or cooler, but this only applies to vehicles having heating/cooling built into the steering wheel assembly. Others have proposed pre-air conditioning a passenger compartment by remote control, which may include detecting a surface temperature of a steering wheel by an infrared sensor, adjusting HVAC louvers from an HVAC duct outlet near the steering wheel and blowing air from the outlet in order to reduce the temperature of the steering wheel before the driver enters the vehicle. This may be employed in vehicles where the steering wheel does not have its own heating/cooling elements. However, these systems do not assure complete conditioning of the steering wheel with the least power use to achieve the desired temperature.

SUMMARY OF THE INVENTION

An embodiment contemplates a method of heating/cooling an interior of a vehicle comprising: receiving a heating/cooling request; automatically directing heated/cooled air from an HVAC duct through louvers adjacent to a steering wheel into a passenger compartment; and automatically rotating the steering wheel back-and-forth to change the location where the heated/cooled air is blown onto the steering wheel.

An embodiment contemplates a method of heating/cooling an interior of a vehicle comprising: receiving a heating/cooling request; automatically directing heated/cooled air from an HVAC duct through louvers adjacent to a steering wheel into a passenger compartment; taking an image of the steering wheel with an infrared camera and automatically rotating the steering wheel back-and-forth to change the location where the heated/cooled air is blown onto the steering wheel based on the image.

An advantage of an embodiment is that a steering wheel will be heated/cooled prior to a trip, while using minimal electric power from the vehicle on-board battery. This heating/cooling is provided even for vehicles where the steering wheel lacks embedded heating and cooling components.

BRIEF DESCRIPTION OF THE DRAWINGS

The FIGURE is a schematic perspective view of a portion of a passenger compartment of a vehicle.

DETAILED DESCRIPTION

FIG. 1 illustrates a portion of a passenger compartment 22 of a vehicle 20. The vehicle 20 may be, for example, a battery electric or a plug-in hybrid electric vehicle. As such, the vehicle 20 may connect to a battery charger 23, as is known in the art.

A steering wheel 24, in front of a seat 26 and adjacent to a center console 28 having a gear shifter 30, may be located in the passenger compartment 22. The steering wheel 24 may be mounted on a steering column 32, adjacent to an instrument panel 34 and above an accelerator pedal 36 and a brake pedal 38. The instrument panel 34 may include various gauges 40 and switches 42. These elements are generally known in the art.

The instrument panel 34 may also include heating, ventilation and air conditioning (HVAC) ducts 44 that are located on both the left and right hand side of the steering wheel 24. Each of the ducts 44 includes sets of louvers 46, which allow for adjustment to direct the air from each duct both up-down and right-left.

Louver actuators 48 control movement of the louvers 46, allowing for automated adjustment of the air flow direction from a controller 50. The controller 50 may be made up of various combinations of electronic hardware and software as is known in the art, and may communicate with the louver actuators 48 through wired or wireless communications. The louver actuators 48 may include motors and gearing to affect movement of the louvers 46.

One or more cabin temperature sensors 52 may be located in the passenger compartment 22, for example in the instrument panel 34, and communicate with the controller 50. The cabin temperature sensor(s) 52 may be employed to detect the temperature of the interior of the passenger compartment 22.

An infrared camera 54 may be located in a position allowing the camera 54 to detect the temperature of various portions of the steering wheel 24, particularly the upper portion 56 where a driver's hands may be located during vehicle operation. This mounting location may be wherever is practicable, such as for example the instrument panel 34, the center console 28, a rear view mirror or a vehicle headliner.

A steering assembly 58, in addition to the steering wheel 24 and the steering column 32, may include a column tilt actuator 60, which affects up-and-down tilt of the steering column 32, a column telescope actuator 62, which affects fore-and-aft telescoping of the steering column 32, and a steering rotation actuator 64, which affects clockwise and counterclockwise rotation of the steering wheel 24. The actuators 60, 62, 64 may all communicate with the controller 50, and each may include motors and gearing to affect movement of the steering column 32 and steering wheel 24.

The vehicle 20 may include a telematics system 66, which is in communication with the controller 50 and also wirelessly in communication with a remote location 68, which may include communication through the internet or cellular communication network, as is known in the art.

The cooling/heating of the steering wheel 24 will now be discussed. The term "heating/cooling" or "cooling/heating" as used herein means either heating or cooling based on the temperature of the passenger compartment and/or steering wheel. For example, on a cold winter day, the request would be for heating since the passenger compartment and steering wheel would be cold. The ability to detect whether heating or cooling is needed in a vehicle is known in the art as many current automatically controlled HVAC systems in vehicles provide such a function.

One may set a predetermined trip start time, either while previously in the vehicle 20 or through a remote device 70, such as for example a cell phone or other internet connected device; or one may employ a remote device to indicate a trip time is to begin shortly, such as for example in fifteen to twenty minutes. This advanced notice of trip time allows for an electric or plug-in hybrid electric vehicle to begin a cooling/heating process while the vehicle 20 is presumably still connected to the battery charger 23. As such, the power from the battery charger 23 may be employed rather than beginning to drain the vehicle's on-board battery.

At a predetermined time before the trip start time, which may depend upon how hot or cold the passenger compartment 22 and/or ambient temperature are, the air conditioning/heating, as the case may be, is activated. This air conditioning/heating may be used for the specific purpose of cooling/heating the steering wheel 24, but may be employed first to cool/heat the passenger compartment 22 prior to specifically addressing the steering wheel 24. In the latter case, the cooling/heating is blown into the passenger compartment 22 through the louvers 46 via the HVAC ducts 44 until a desired passenger compartment temperature is reached. The desired temperature may be preset by the person requesting the preconditioning.

Around the time the desired temperature in the passenger compartment 22 is being reached (this can be shortly before reaching the desired temperature), the controller 50 automatically controls the louver actuators 48 to direct the air from the HVAC ducts 44 toward the steering wheel 24. This direction may be toward the upper portion 56 of the steering wheel 24, if so desired.

As the cooled/heated air is directed toward the steering wheel 24, the infrared camera 54 may take an image of the steering wheel 24. From this image, the controller 50 determines which portions of the steering wheel 24 are the coldest/hottest and employs the steering rotation actuator 64 to rotate the steering wheel 24 to assure that the cooled/heated air is directed most efficiently onto these coldest/hottest portions. The steering wheel 24 may be rotated by clockwise and counter clockwise to assure that all of the desired cooling/heating of the steering wheel 24 is accomplished. The infrared camera 54 may take multiple images during this process in order to allow the controller 50 adjust to the most recent cold/hot spots on the steering wheel 24 as the steering wheel cooling/heating process is occurring. Alternatively, or in addition, predetermined optimal positioning of the steering wheel 24 and louvers 46 may be determined through the use of computer aided design (CAD) and computer aided engineering (CAE), in which case the louvers 46 and steering wheel 24 may be pre-positioned to the preferred cooling/heating positions upon initiation of the steering wheel 24 cooling/heating process.

Additionally, if rotation of the steering wheel 24 is not deemed sufficient to assure the desired cooling/heating, then the controller 50 may employ the column tilt actuator 60 and/or the column telescope actuator 62 to better align the cold/hot spots on the steering wheel 24 with the air flowing from the louvers 46. This may occur any time during the cooling/heating process as needed based on the most recent infrared camera image.

Accordingly, by the time a person arrives at and disconnects the vehicle 20 from the battery charger 23, the passenger compartment 22 and especially the steering wheel 24, are cooled/heated to a comfortable level for one to begin the trip. This, in turn, reduces the load on the on-board battery as the trip begins. Moreover, this process allows for cooling/heating the steering wheel 24, even for vehicles that do not have cooling/heating elements built into the steering wheel.

While certain embodiments of the present invention have been described in detail, those familiar with the art to which this invention relates will recognize various alternative designs and embodiments for practicing the invention as defined by the following claims.

The invention claimed is:

1. A method of heating/cooling an interior of a vehicle comprising: receiving a heating/cooling request; automatically directing heated/cooled air from a heating, ventilation, air conditioning (HVAC) duct through louvers adjacent to a steering wheel into a passenger compartment; and automatically rotating the steering wheel back-and-forth to change the location where the heated/cooled air is blown onto the steering wheel.

2. The method of claim 1 further including:
taking an image of the steering wheel with an infrared camera; and
adjusting the automatic rotation of the steering wheel based on the image.

3. The method of claim 2 further including, automatically telescoping the steering wheel in-and-out to change the location where the heated/cooled air is blown onto the steering wheel.

4. The method of claim 2 further including, automatically tilting the steering wheel up-and-down to change the location where the heated/cooled air is blown onto the steering wheel.

5. The method of claim 2 further including, automatically adjusting the louvers to direct the heated/cooled air onto the steering wheel.

6. The method of claim 1 wherein the heating/cooling request is wirelessly transmitted remotely from the vehicle.

7. The method of claim 1 wherein the vehicle is connected to an electrical outlet for battery charging during the heating/cooling of the steering wheel.

8. The method of claim 1 further including, automatically telescoping the steering wheel in-and-out to change the location where the heated/cooled air is blown onto the steering wheel.

9. The method of claim 1 further including, automatically tilting the steering wheel up-and-down to change the location where the heated/cooled air is blown onto the steering wheel.

10. The method of claim 1 further including, automatically adjusting the louvers to direct the heated/cooled air onto the steering wheel.

11. The method of claim 1 wherein the heating/cooling request is based on a predetermined trip start time.

12. The method of claim 1 further including, upon receiving the heating/cooling request and automatically directing heated/cooled air from the HVAC duct through the louvers, heating/cooling the passenger compartment to a predetermined temperature before automatically rotating the steering wheel.

13. The method of claim 12 further including, upon heating/cooling the passenger compartment to the predetermined temperature, automatically adjusting the louvers to direct the heated/cooled air onto the steering wheel.

14. A method of heating/cooling an interior of a vehicle comprising: receiving a heating/cooling request; automatically directing heated/cooled air from a heating, ventilation, air conditioning (HVAC) duct through louvers adjacent to a steering wheel into a passenger compartment; automatically adjusting the louvers to direct the heated/cooled air onto the steering wheel upon heating/cooling the passenger compartment to a predetermined temperature; taking an image of the steering wheel with an infrared camera; and automatically rotating the steering wheel back-and-forth to change the location where the heated/cooled air is blown onto the steering wheel based on the image.

15. The method of claim 14 further including, automatically tilting the steering wheel up-and-down to change the location where the heated/cooled air is blown onto the steering wheel.

\* \* \* \* \*